United States Patent

[11] 3,607,669

| | | | | |
|---|---|---|---|---|
| [72] | Inventor | John C. Jubin, Jr. Wallingford, Pa. | | |
| [21] | Appl. No. | 813,727 | | |
| [22] | Filed | Apr. 4, 1969 | | |
| [45] | Patented | Sept. 21, 1971 | | |
| [73] | Assignee | Atlantic Richfield Company New York, N.Y. | | |

[54] SEPARATION OF PROPYLENE OXIDE FROM WATER BY DISTILLATION WITH AC-8 TO 12 HYDROCARBON
13 Claims, No Drawings

[52] U.S. Cl.................................................... 203/14, 203/52, 203/68, 203/70, 203/91, 260/348.5 R, 260/348 R
[51] Int. Cl...................................................... B01d 3/34
[50] Field of Search............................................ 203/68–70, 52, 14; 260/348.5 LL, 348.5 LV, 348

[56] References Cited
UNITED STATES PATENTS

| | | | |
|---|---|---|---|
| 2,903,465 | 9/1959 | Suter et al..................... | 203/70 |
| 3,039,940 | 6/1962 | Prinz............................ | 203/70 |
| 3,338,800 | 8/1967 | Binning et al................. | 203/68 |
| 3,449,219 | 6/1969 | Schmidt........................ | 203/70 |
| 3,464,897 | 9/1969 | Jubin............................ | 203/70 |

*Primary Examiner*—Wilbur L. Bascomb, Jr.
*Attorneys*—Donald W. Canady and Charles R. Wetter

ABSTRACT: This invention relates to a method of separating propylene oxide from water which comprises distilling the mixture in the presence of an open chain or cyclic paraffin containing from 8 to 12 carbon atoms. The paraffin alters the volatility of the water relative to that of propylene oxide and permits the removal of water as overhead while the propylene oxide is taken off as bottoms. The amount of paraffin utilized normally ranges from about 5 to about 40 parts by weight per 1 part by weight propylene oxide.

SEPARATION OF PROPYLENE OXIDE FROM WATER BY DISTILLATION WITH AC-8 TO 12 HYDROCARBON

BACKGROUND OF INVENTION

Propylene oxide is highly hygroscopic thus water contamination presents a serious problem in its production and storage. In the epoxidation of propylene, contaminating amounts of water are found in the reaction product. When propylene oxide is used in polymerization reactions the presence of water interferes with the polymerization. Because of the difference in boiling points (PO=35° C.) prior art separations have been made utilizing distillation techniques in which the propylene oxide is taken off as overhead and the water is removed as bottoms. One difficulty that is encountered is that the water and propylene oxide form an azeotrope at pressures which are commercially desirable in this type of distillation (i.e., 30–40 p.s.i.a.). Consequently, it is necessary to operate the column at a much lower pressure (about 20 p.s.i.a.) to avoid even approaching the formation of an azeotrope. At this lower pressure the condensing and tower costs are higher. If the pressure is much below 20 p.s.i.a. these costs become prohibitive

SUMMARY OF THE INVENTION

It has now been discovered that a highly efficient separation can be obtained over a wide pressure range by adding to the distillation an open chain or cyclic paraffin as a distillation agent. The paraffin changes the volatility of the water relative to that of propylene oxide and makes an effective separation possible. Furthermore, the paraffin prevents the formation of an azeotrope between the water and the propylene oxide at higher pressures. Furthermore, while conventional distillation at 20 p.s.i.a. requires reflux to feed weight ratios in the order of 7–10, the distillations of this invention only require reflux ratios of 2–4 at the same pressure. This reduced reflux ratio results in lower costs and permits the use of smaller equipment.

The invention comprises a method for separating propylene oxide from water by distilling the mixture in the presence of an acyclic or cyclic paraffin containing 8 to 12 carbon atoms. The paraffin is present in an amount sufficient to effect a separation of propylene oxide from the water. The propylene oxide and paraffin are removed as bottoms and the water is taken off as overhead. This type of separation can be utilized for all single phase mixtures of propylene oxide and water wherein water is the minor component. A phase separation will occur at concentrations representing the maximum solubility of water in propylene oxide. This distillation is particularly suited for propylene oxide/water mixtures wherein the water represents from about 0.1 to 5 percent by weight of the mixture.

Therefore, it is an object of this invention to provide a method for the fractional distillation of propylene oxide to effect a separation from water.

The paraffin can be any saturated, acyclic or cyclic hydrocarbon containing from 8 to 12 carbon atoms. Preferably, the paraffin contains from 8 to 10 carbon atoms. For example, octane, isooctane, nonane, decane, undecane, dodecane, ethyl cyclohexane, propyl cyclopentane, propyl cyclohexane, diethyl cyclohexane, hexyl cyclohexane and dimethyl cyclohexane can be used. It is preferred to use a paraffin which does not azeotrope with the propylene oxide. This eliminates a difficult downstream separation between the propylene oxide and paraffin.

Optimum separations are obtained when the paraffin is present in an amount sufficient to lower the effective boiling point of the water at least 50° C. below that of the propylene oxide. For most separations paraffin concentrations ranging from about 5 to about 40 parts by weight per 1 part by weight propylene oxide are sufficient. Preferably, the paraffin concentrations ranges from 10 to 30 parts by weight per part propylene oxide in the feed. Commercial operations have operated very satisfactory when the paraffin to feed weight ratio is about 15.

The fractional distillation can be carried out under normal distillation conditions. For example, a pressure ranging from about 20 to about 35 p.s.i.a. and a temperature ranging from about 250° F. to about 300° F. (both being measured at the bottom of the column) can be used. This pressure range is selected such that (1) the overhead condenses at a reasonable temperature, preferably at about 100° F. to eliminate the need for refrigeration and (2) the column temperature is low enough so that propylene oxide and water do not react to form excess amounts of glycols. Preferably, the feed and the paraffin are introduced near a point at the top of the column, with the paraffin being introduced above the feed. The water along with some propylene oxide is taken off as overhead with a portion being recycled to the column to provide the necessary reflux.

Since the overhead is composed of water and propylene oxide, the efficiency of the reflux can be enhanced by subcooling the overhead at a temperature at which the maximum solubility of water in propylene oxide is exceeded and a separate water phase occurs. This separate water phase can be decanted and then a portion of the enriched propylene oxide stream used as the reflux to the column. The amount of water in the reflux can also be reduced by injecting paraffin into the overhead. This can be accomplished by either adding paraffin directly to the overhead, or permitting some of the paraffin in the column to come off overhead. The paraffin will be dissolved by the propylene oxide and being hydrophobic will force some of the water out of the mixture. The separate water stream is then decanted and a portion of the enriched propylene oxide used as a reflux. A combination of both paraffin injection and subcooling can be used to remove water from the reflux.

The hydrophobic nature of the paraffin can also be used to remove water from the feed. By combining a portion of paraffin with the feed prior to their entrance into the column a separate water phase can be precipitated and decanted from the feed.

The bottoms comprise the paraffin and the bulk of propylene oxide. Other impurities such as six and five carbon hydrocarbons or light components may also be present in the feed. However, so long as such impurities do not interfere with the separation of propylene oxide and water they may be taken overhead with the water or off as bottoms with the propylene oxide. The bottoms can be subjected to further separation to remove the paraffin from the propylene oxide. The paraffin can then be recycled to the column.

The following example is given to illustrate a specific embodiment of the invention and should not be construed as a limitation upon the scope of the invention.

EXAMPLE I

A propylene oxide/water mixture (containing 0.42 pounds $H_2O$/1000 mixture) was fed to a distillation column. This column contained 85 valve-type distillation trays. The feed was introduced on the 23rd tray from the top and the column was operated at 194° F. overhead, and 264° F. and 25 p.s.i.a. at the bottom. Octane was introduced above the trays. The weight ratio of paraffin to feed was 26. The column was operated with a reflux to overhead weight ratio of 17. The reflux to feed weight ratio was 2.7. The bottoms comprised propylene oxide and octane. The propylene oxide had a water content of less than 0.02 pounds per 100 pounds of feed. The overhead comprised the major part of the water and a minor portion of the propylene oxide (15 pounds of propylene oxide per 100 pounds of feed).

The paraffin lowered the effective boiling point of the water to minus 30° F. (−34° C.). The boiling point of the propylene oxide was 122° F. (50° C.).

Feeding the solvent to the top tray resulted in some of it coming overhead necessitating a small auxiliary tower to recover the solvent from the overhead. This could be eliminated by introducing the solvent further down the column (i.e., 5 to 10 trays from the top).

I claim:

1. In the fractional distillation of propylene oxide containing from 0.1 to 5 percent by weight of water, the improvement which comprises (a) distillating the mixture in the presence of a paraffin containing from 8 to 12 carbon atoms said paraffin being introduced into the distillation column above the trays in an amount sufficient to effect a separation of propylene oxide from the water, (b) removing the major portion of propylene oxide and paraffin as bottoms, said propylene oxide containing less than 200 p.p.m. water and (c) removing the major portion of the water as overhead.

2. A method according to claim 1 wherein the paraffin is present in an amount sufficient to lower the effective boiling point to the water to at least 50° C. below the boiling point of propylene oxide.

3. A method according to claim 1 wherein the amount of paraffin ranges from about 5 to about 40 parts per part propylene oxide in the feed.

4. A method according to claim 1 wherein the paraffin is an acyclic compound.

5. A method according to claim 4 wherein the paraffin contains from 8 to 10 carbon atoms.

6. A method according to claim 5 wherein the paraffin is octane.

7. A method according to claim 1 wherein the distillation is carried out at a pressure ranging from about 20 p.s.i.a. and a temperature ranging from 250° F. to 300° F.

8. In the fractional distillation of propylene oxide containing from 0.1 to 5 percent by weight of water, the improvement which comprises:

a. distilling the mixture in the presence of a paraffin containing from 8 to 12 carbon atoms, said paraffin acting as a distillation aid and being introduced into the distillation column above the trays in an amount between 10 and 30 parts by weight per part propylene oxide in the feed and sufficient to effect the relative volatility of the water and propylene oxide, whereby distillation can be carried out at between 20 p.s.i.a. and 35 p.s.i.a. and a temperature between 250° F. and 300° F. such that the major portion of the propylene oxide and paraffin are removed as bottoms containing not more than 200 p.p.m. water, and removing the major portion of the water as overhead, and b. subjecting said overhead to further paraffin treatment causing a phase separation between the water and the propylene oxide and returning the enriched propylene oxide phase to the column as reflux.

9. The method according to claim 8 wherein the distillation takes place at about 260° F. under a pressure of about 25 p.s.i.a. in the presence of about 15 parts octane by weight per part propylene oxide.

10. A method according to claim 8 wherein the paraffin is present in an amount sufficient to lower the effective boiling point to the water to at least 50° C. below the boiling point of propylene oxide.

11. A method according to claim 8 wherein the paraffin is an acyclic compound.

12. The method according to claim 8 wherein the overhead is subcooled to further enhance the phase separation caused by the paraffin treatment in preparing the propylene oxide enriched reflux.

13. The method according to claim 8 wherein the feed to the distillation column is pretreated with a portion of the paraffin in an amount sufficient to cause a phase separation between propylene oxide and water whereby the separate water phase can be decanted and the enriched propylene oxide stream introduced into the column as feed.